Figure 1:
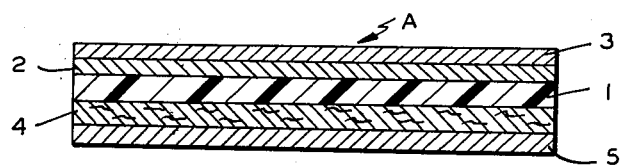

March 10, 1964  E. T. LARSON, JR  3,124,683
RADIOGRAPHIC FILM PACKAGE
Filed Feb. 8, 1960

*INVENTOR.*
ERNEST T. LARSON, JR.
BY
ATTORNEYS 3,124,683
RADIOGRAPHIC FILM PACKAGE
Ernest T. Larson, Jr., Binghamton, N.Y., assignor to General Aniline & Film Corporation, New York, N.Y., a corporation of Delaware
Filed Feb. 8, 1960, Ser. No. 7,217
3 Claims. (Cl. 250—68)

This invention relates to a method of improving the definition of high-voltage radiographs and to a novel film package for use in connection therewith.

The standard practice in industrial radiography with X-rays in the 100 kvp. to 3000 kvp. voltage range, and with radioactive isotopes which emit gamma rays having energies corresponding to 100 kvp. to 3000 kvp. X-rays, is to use a film with emulsion coated on both sides of the base and to place lead screens of .005 to .020 inch thickness in contact with both sides of the film. The purpose of the lead screens is (1) to absorb the unwanted scattered radiation, which is less penetrating than the primary beam and (2) to intensify, by exposing the film to electrons which the radiation, upon being absorbed by the lead, ejects from the screens. Double-coated film is used in order to absorb as much of the incident radiation and as many of the electrons from the screens as feasible, thus increasing the effective speed of the film.

In high-energy radiation (approximately 500 kvp. and higher), it is believed that electrons from a lead screen penetrate the emulsion and the base and enter the opposite emulsion, thus causing exposure in both emulsion layers. Electrons are ejected from both sides of a lead screen in approximately equal amounts. Because the electrons form a divergent beam, the image formed in the opposite emulsion layer is more diffuse than the image formed in the emulsion next to the screen and this is considered to be the major source of loss in radiographic definition.

It is an object of this invention to provide a new process of producing radiographs of improved definition.

It is a further object of this invention to provide a new process of producing radiographs utilizing an emulsion coating on one side only of the film.

It is a still further object of this invention to provide a novel film package for use in radiography.

Other objects and advantages of this invention will appear to those skilled in the art from the detailed description thereof given below.

I have discovered that the difficulties of the prior art may be overcome and a very good definition of the image in a radiograph may be obtained by coating a film base with the emulsion on one side of the base only, placing a lead screen in contact with the emulsion, placing a material which emits a minimum number of electrons into the emulsion layer, such as cardboard, in contact with the uncoated side of the base and placing a lead screen in contact with the cardboard. In practice, I have found that the two lead screens should each have a thickness of about .005 inch and the cardboard should be of a thickness of .08 inch or greater. The purpose of the screen on the backside of the cardboard is to absorb back-scattered radiation from the walls of the room.

The base of the film may be any of the materials heretofore used in making radiographs. I have found that cellulose ester, such as cellulose acetate for example, is a suitable base material. Any conventional emulsion heretofore used in making radiographs may also be used.

A radiograph was made of a clock using a film constructed as indicated above with radiation from cobalt 60 which has energy approximately equivalent to 2000 kvp. X-rays, by placing the film with the emulsion side toward the source of radiation. Another radiograph was made in the same manner and using the same emulsion but using a double coated film of the prior art in place of the film of this invention. When the images on the two films, after exposure, were compared it was found that the definition of the image produced by using the process and film of this invention was far superior to the definition of the image produced by the prior art film.

In general, my novel film package will produce good results if the screen on the emulsion side of the film is composed of a dense, high-atomic-number material, such as lead, which emits electrons in a forward direction (toward the film) from a thin layer of the screen material, and if the screen on the base side of the film is composed of a low-atomic-number material, such as cardboard, which emits relatively few electrons in the backward direction (toward the film) and is thick enough to absorb completely any electrons emitted in the backward direction by the lead screen behind it or by any other material, such as the film holder, behind it.

Figure 2:
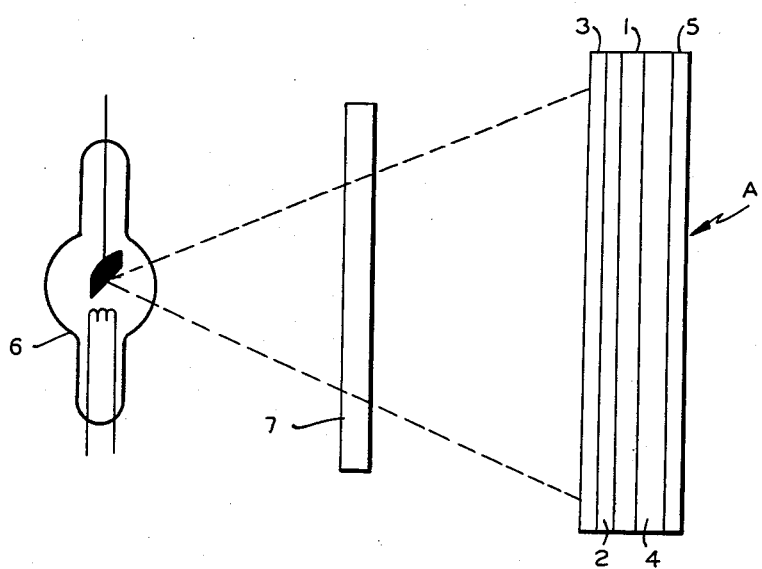

The invention is illustrated in the accompanying drawing wherein:

FIGURE 1 is a cross-sectional view of my novel film package on an enlarged scale and FIGURE 2 is a schematic view of the system used in taking radiographs using my novel film package.

Referring to FIGURE 1, A designates the film package as a whole, 1 is the base of the film which may be any one of the bases commonly used for X-ray film such as cellulose acetate or the like, 2 is the emulsion layer, 3 is the lead screen in contact with the emulsion layer, 4 is the low-atomic-number material, such as cardboard in contact with the back or uncoated side of the base and 5 is a lead screen in contact with the cardboard layer.

FIGURE 2 shows a system which may be used for making radiographs wherein 6 is the X-ray tube or gamma-ray source and 7 is the object to be radiographed disposed between the tube 6 and film A.

Modifications may be resorted to within the scope of the appended claims.

I claim:
1. A film package suitable for use in making radiographs utilizing radiations of the order of 500 kvp. and higher which comprises a base, an emulsion layer coated on one side only of said base, a lead screen in contact with said emulsion layer, a screen formed of a low-atomic-number material which emits relatively few electrons in a backward direction, one surface of said last mentioned screen being in direct contact with the uncoated side of said base and a lead screen in contact with the other surface of said low-atomic-number material screen, the two lead screens being of substantially the same thickness and the thickness of said low-atomic-number material screen being materially greater than the thickness of said lead screens.

2. A film package as recited in claim 1 wherein said low-atomic-number material is cardboard.

3. A film package as recited in claim 2 wherein the cardboard screen has a thickness of at least .08 inch and said lead screens each has a thickness of about .005 inch.

References Cited in the file of this patent

UNITED STATES PATENTS 1,909,312   Page ------------------ May 16, 1933
2,144,392   Saffir ---------------- Jan. 17, 1939